(12) United States Patent
Fujikake et al.

(10) Patent No.: US 10,232,749 B2
(45) Date of Patent: Mar. 19, 2019

(54) SEAT HOOKING STRUCTURE

(71) Applicants: Tachi-S Co., Ltd., Tokyo (JP); Honda Motor Co., Ltd., Tokyo (JP)

(72) Inventors: Tsutomu Fujikake, Tokyo (JP); Tomoyo Futakawame, Saitama (JP); Tomoyuki Uemura, Saitama (JP); Taku Nagasawa, Saitama (JP); Shinobu Sasaki, Saitama (JP)

(73) Assignees: Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/567,961

(22) PCT Filed: Apr. 11, 2016

(86) PCT No.: PCT/JP2016/061724
§ 371 (c)(1),
(2) Date: Oct. 19, 2017

(87) PCT Pub. No.: WO2016/171026
PCT Pub. Date: Oct. 27, 2016

(65) Prior Publication Data
US 2018/0118066 A1    May 3, 2018

(30) Foreign Application Priority Data

Apr. 24, 2015 (JP) ................................. 2015-089742
Aug. 20, 2015 (JP) ................................. 2015-162961

(51) Int. Cl.
*B60N 2/60* (2006.01)
*B60N 2/58* (2006.01)
(Continued)

(52) U.S. Cl.
CPC ............ *B60N 2/6018* (2013.01); *A47C 31/11* (2013.01); *B60N 2/5816* (2013.01); *B60N 2/5825* (2013.01); *B68G 7/052* (2013.01)

(58) Field of Classification Search
CPC .. B60N 2/6018; B60N 2/6027; B60N 2/5816; B60N 2/5825; B60N 2/6054;
(Continued)

(56) References Cited

U.S. PATENT DOCUMENTS

2006/0214485 A1* 9/2006 Brockschnieder ... B60N 2/5816
297/228.11
2009/0121530 A1* 5/2009 Yasuda ................ B60N 2/5816
297/224

(Continued)

FOREIGN PATENT DOCUMENTS

DE          3631872 C1 * 10/1987 ........... B60N 2/0284
DE     102008062346 A1 *  6/2010 ........... B60N 2/5816
(Continued)

OTHER PUBLICATIONS

International Search Report issued in corresponding International Patent Application No. PCT/JP2016/061724 dated Jun. 21, 2016.
(Continued)

*Primary Examiner* — Timothy J Brindley
(74) *Attorney, Agent, or Firm* — Morgan, Lewis & Bockius LLP

(57) ABSTRACT

A seat hooking structure (10) which supports by hooking a changeable cover (7) so as to be detachably attached to a seat member provided with a base trim cover (6), the seat hooking structure (10) comprising: an open-type fastening member (5) which is not sewn to the base trim cover (6), the fastening member (5) including a fastener part constituted by one fastener half (511) and another fastener half (512), and a slider part that slides along the fastener part so as to
(Continued)

open and close the one fastener half (511) and the other fastener half (512); and an anchoring member (18) which anchors the one fastener half (511) to the seat member in a groove for hooking (11). The other fastener half (512) and the changeable cover (7) are secured to each other by a securing part (74).

9 Claims, 7 Drawing Sheets

(51) Int. Cl.
*A47C 31/11* (2006.01)
*B68G 7/052* (2006.01)

(58) Field of Classification Search
CPC .. B60N 2/6036; B60N 2/5841; B60N 2/5858; B60N 2/5833
See application file for complete search history.

(56) References Cited

U.S. PATENT DOCUMENTS

| | | | | |
|---|---|---|---|---|
| 2009/0160230 | A1* | 6/2009 | Yasuda | B60N 2/5816 297/228.13 |
| 2012/0306256 | A1* | 12/2012 | Okuyama | B60N 2/5825 297/452.6 |
| 2015/0165947 | A1* | 6/2015 | Clauser | B60N 2/5825 297/452.18 |

FOREIGN PATENT DOCUMENTS

| | | | | |
|---|---|---|---|---|
| EP | 2774807 A2 | * | 9/2014 | ........... B60N 2/5825 |
| EP | 3072735 A1 | * | 9/2016 | ........... B60N 2/5825 |
| FR | 2921873 A1 | * | 4/2009 | ........... B60N 2/0284 |
| FR | 2939085 A1 | * | 6/2010 | ........... B60N 2/5825 |
| JP | S59-029999 U | | 2/1984 | |
| JP | S61-107392 U | | 7/1986 | |
| JP | H02-112198 U | | 9/1990 | |
| JP | H02-141256 U | | 11/1990 | |
| JP | 2003-024187 A | | 1/2003 | |
| JP | 2009153560 A | * | 7/2009 | ........... B60N 2/5816 |
| JP | 2011-254934 A | | 12/2011 | |
| JP | 2016097947 A | * | 5/2016 | ............ B60N 2/60 |
| JP | 2016202673 A | * | 12/2016 | ............ B60N 2/90 |
| JP | 2016203825 A | * | 12/2016 | ............ A47C 31/02 |
| WO | WO-2007008662 A2 | * | 1/2007 | ........... B60N 2/5825 |
| WO | WO-2015029131 A1 | * | 3/2015 | ........... A47C 31/023 |
| WO | WO-2016084757 A1 | * | 6/2016 | ............ B60N 2/60 |
| WO | WO-2016121617 A1 | * | 8/2016 | ............ B68G 7/05 |

OTHER PUBLICATIONS

International Preliminary Report on Patentability and Written Opinion issued in corresponding International Patent Application No. PCT/JP2016/061724 dated Oct. 24, 2017.

* cited by examiner

SEAT HOOKING STRUCTURE

TECHNICAL FIELD

The present invention relates to a seat hooking structure.

BACKGROUND ART

A seating face and a seat backrest constituting a vehicle seat is typically formed by a cushioning material made of a foamed material, a trim cover covering the cushioning material, etc. In addition, use has also been made of a seat further including wadding and a detachable changeable cover which can be changed in accordance with a user's preference.

For example, Patent Document 1 has proposed a vehicle seat in which a hooking groove is formed in a seat cushion body and in which a cover can be detachably attached to the seat cushion body by a slide fastener provided in the groove. In this configuration, one fastener piece of the slide fastener is attached to grooves formed in a peripheral surface of the seat cushion body and the seating face and the other fastener piece is attached to a peripheral edge and an inner face of the cover such that the other fastener piece can be engaged with the one fastener piece (see Patent Document 1).

CITATION LIST

Patent Document

Patent Document 1: Japanese Unexamined Utility Model Application Publication No. H02-141256

SUMMARY

Technical Problem

However, the above-mentioned vehicle seat employs a structure in which a trim cover (cover) is changeable by making it detachably attachable using a slide fastener that is sewn to a base trim cover (corresponding to a main pad cover wrapping the seat cushion body and a side pad upper cover covering a side portion of the pad in Patent Document 1). Thus, if the slide fastener is broken, the base trim cover also has to be replaced and the repair cost will be increased.

An object of the present invention is to provide a seat hooking structure which, when a fastening member for attaching and detaching a changeable cover is broken, enables only the fastening member to be replaced without replacing a base trim cover and thereby enables repair costs to be reduced.

Solution to Problem

In order to solve the above-mentioned problem, the present invention provides a seat hooking structure which supports by hooking a changeable cover so as to be detachably attached to a seat member provided with a base trim cover, the seat hooking structure comprising: a fastening member constituted by an open-type slide fastener that includes: a fastener part constituted by one fastener half and another fastener half; and a slider part that slides along the fastener part so as to open and close the one fastener half and the other fastener half, the fastening member not being sewn to the base trim cover; and an anchoring member which anchors the one fastener half to the seat member in a groove for hooking formed in the seat member, wherein the other fastener half and the changeable cover are secured to each other by a securing part.

In such hooking structure, since the fastening member is not sewn to the base trim cover, the base trim cover and the fastening member are independent of each other, and it is possible for only the fastening member to be replaced by releasing the anchored state of the anchoring member while leaving the base trim cover as-is. Accordingly, when the fastening member is broken, it is possible for only the fastening member to be replaced without the need to replace the base trim cover.

It is preferable for an insert member, with which the anchoring member is to be engaged, to be provided inside the seat member. By engaging one end of the anchoring member with the insert member, the anchoring member becomes more difficult to be pulled out.

It is preferable for at least a portion of the one fastener half, which is anchored to the seat member by the anchoring member, to be reinforced by a reinforcement part. In such case, tension in hooking can be maintained constantly with ease.

The reinforcement part may be constituted by a resin-made reinforcement member which is integrally molded with the one fastener half. By integrally molding the reinforcement member using resin, the cost required for forming the reinforcement member can be reduced.

The reinforcement part may be constituted by a reinforcement member attached to the one fastener half.

The reinforcement part may be constituted by a reinforcement member inserted into the one fastener half which has been sewn into a bag-like shape.

The reinforcement member or the one fastener half may be provided with an anchoring position indicator which indicates an anchoring position of the anchoring member. With such hooking structure, a predetermined number of anchoring members can be provided at appropriate intervals using the anchoring position indicators as markers.

Further, the present invention provides a seat hooking structure which supports by hooking a changeable cover so as to be detachably attached to a seat member, the seat hooking structure comprising: a fastening member constituted by an open-type slide fastener that includes: a fastener part constituted by one fastener half and another fastener half; and a slider part that slides along the fastener part so as to open and close the one fastener half and the other fastener half; and an anchoring member which anchors the one fastener half to the seat member in a groove for hooking formed in the seat member, wherein the other fastener half and the changeable cover are secured to each other by a securing part.

It is preferable for an insert member, with which the anchoring member is to be engaged, to be provided inside the seat member. By engaging one end of the anchoring member with the insert member, it becomes more difficult for the anchoring member to be pulled out.

It is preferable for at least a portion of the one fastener half, which is anchored to the seat member by the anchoring member, to be reinforced by a reinforcement part. In such case, tension in hooking can be maintained constantly with ease.

The reinforcement part may be constituted by a resin-made reinforcement member which is integrally molded with the one fastener half. By integrally molding the reinforcement member using resin, the cost required for forming the reinforcement member can be reduced.

The reinforcement part may be constituted by a reinforcement member attached to the one fastener half.

The reinforcement part may be constituted by a reinforcement member inserted into the one fastener half which has been sewn into a bag-like shape.

The reinforcement member or the one fastener half may be provided with an anchoring position indicator which indicates an anchoring position of the anchoring member. With such hooking structure, a predetermined number of anchoring members can be provided at appropriate intervals using the anchoring position indicators as markers.

Advantageous Effects of Invention

According to the present invention, when a fastening member for attaching and detaching a changeable cover is broken, it is possible for only the fastening member to be replaced without the need to replace the base trim cover, and it is therefore possible to reduce repair costs.

DESCRIPTION OF EMBODIMENTS

Figure 1:
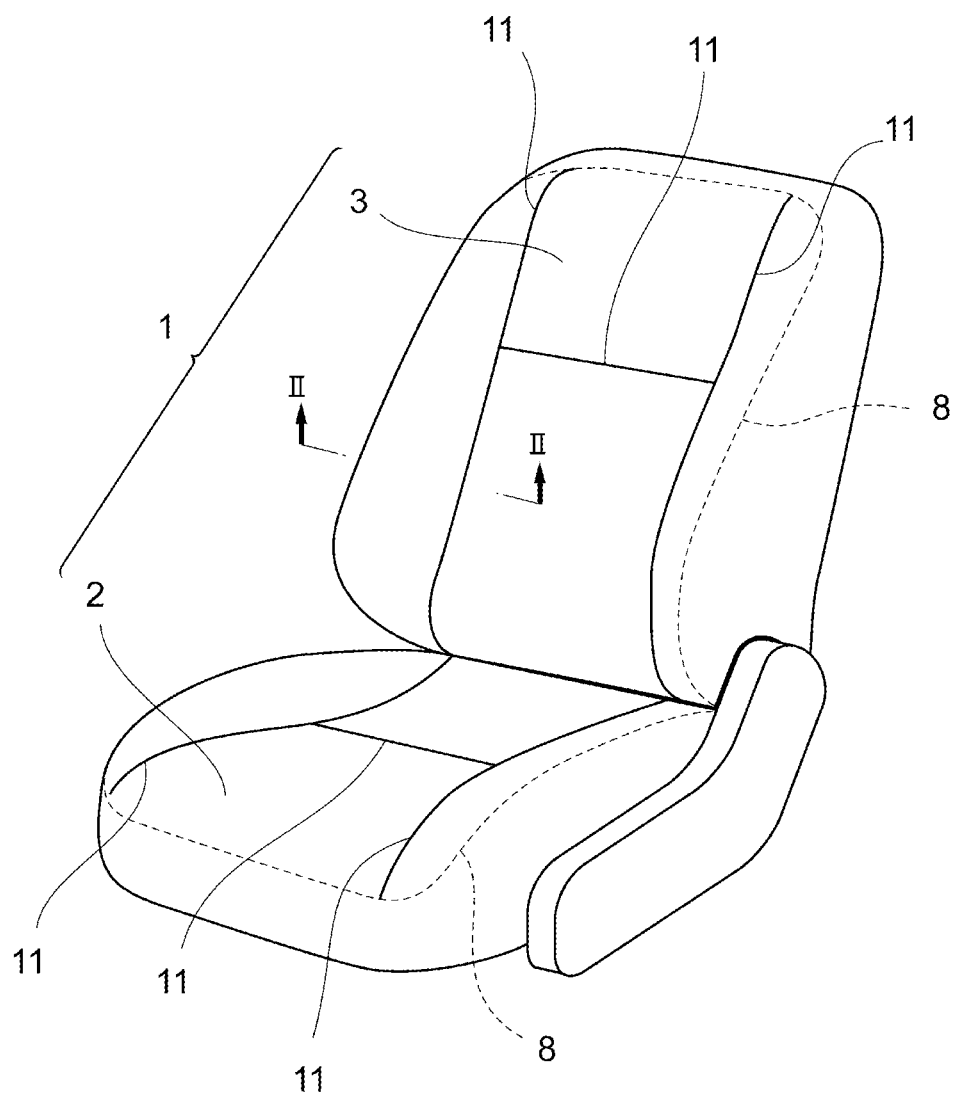
FIG. 1 is a perspective view showing a seat according to an embodiment of the present invention.

A preferred embodiment of a seat hooking structure according to the present invention will be described in detail with reference to the attached drawings (see FIGS. 1-5).

A seat 1 includes a seat face 2 that is moveable forward and rearward on a floor panel of a vehicle and a backrest 3 that is reclinable relative to the seat face 2. The seat face 2 and the backrest 3 are each a seat member constituting the seat 1 and each have a cushioning material 4 made of a foaming material. A changeable cover 7 can be attached to and detached from the seat face 2 and the backrest 3 using a hooking structure 10. The seat face 2 and the backrest 3 are provided with a plurality of linear hooking grooves 11 that constitute the hooking structure 10 (see FIG. 1).

The following description will describe the backrest 3 as an example. The cushioning material 4 constituting the backrest 3 includes a main cushioning part 41 for supporting the back of an occupant from the rear side thereof and a side cushioning part 42 for holding the back of the occupant from lateral sides thereof (see FIG. 2). A surface of the cushioning material 4 is covered with a base trim cover 6 by adhesion or by integral foam molding.

Figure 2:
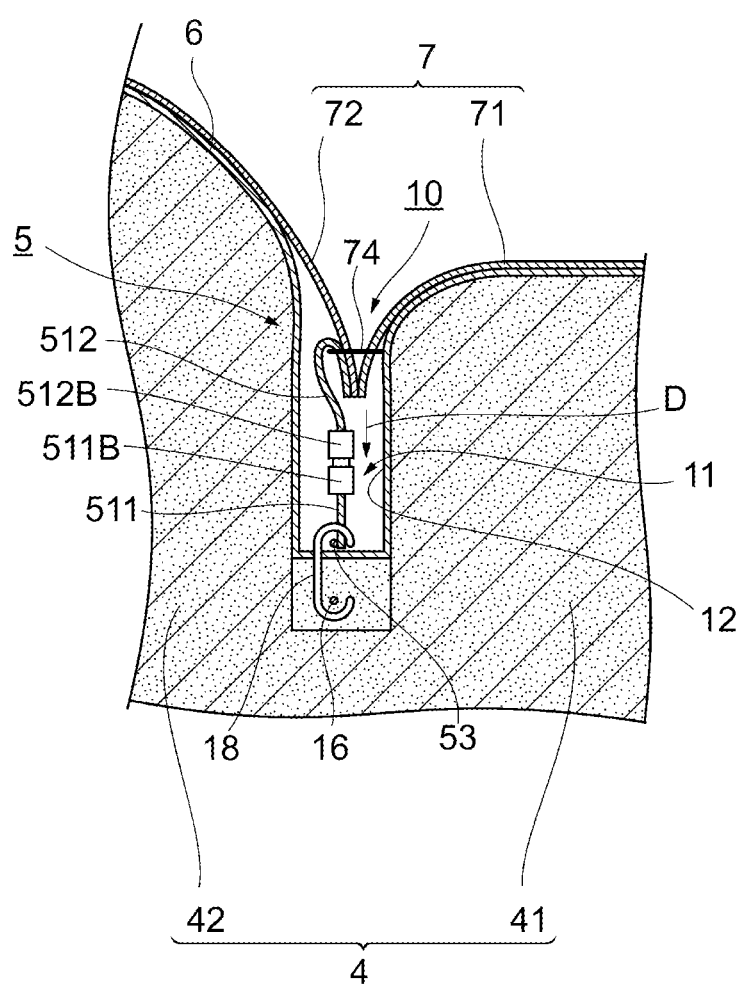
FIG. 2 is a cross-sectional view showing a hooking structure of a backrest (seat member) taken along line II-II in FIG. 1.

The changeable cover 7 is formed by a main face part 71 mounted on the main cushioning part 41 of the cushioning material 4 and a side face part 72 mounted on the side cushioning part 42 (see FIG. 2). The main face part 71 and the side face part 72 of the changeable cover 7 are configured such that: they are joined with each other by a sewing part 74 with their respective front surfaces being in contact with each other; and when the main face part 71 and the side face part 72 cover the cushioning material 4 and the base trim cover 6 with the front surfaces thereof facing the occupant and the back surfaces thereof facing the cushioning material 4, the sewing part 74 and a distal end portion, relative to the sewing part 74, of the changeable cover 7 will not be exposed to the front surface side (see FIG. 2).

An outer circumference of the changeable cover 7 supported by hooking in the hooking groove 11 using a fastening member 5 is attached to the backrest 3 or the seat face 2 by a changeable cover outer circumference fastener 8. It should be noted that the specification and drawings only depict an example arrangement of the changeable cover outer circumference fastener 8 (see FIG. 1) and the description of the structure thereof will be omitted. Further, although not shown, wadding may be provided between the base trim cover 6 and the changeable cover 7.

Figure 3:
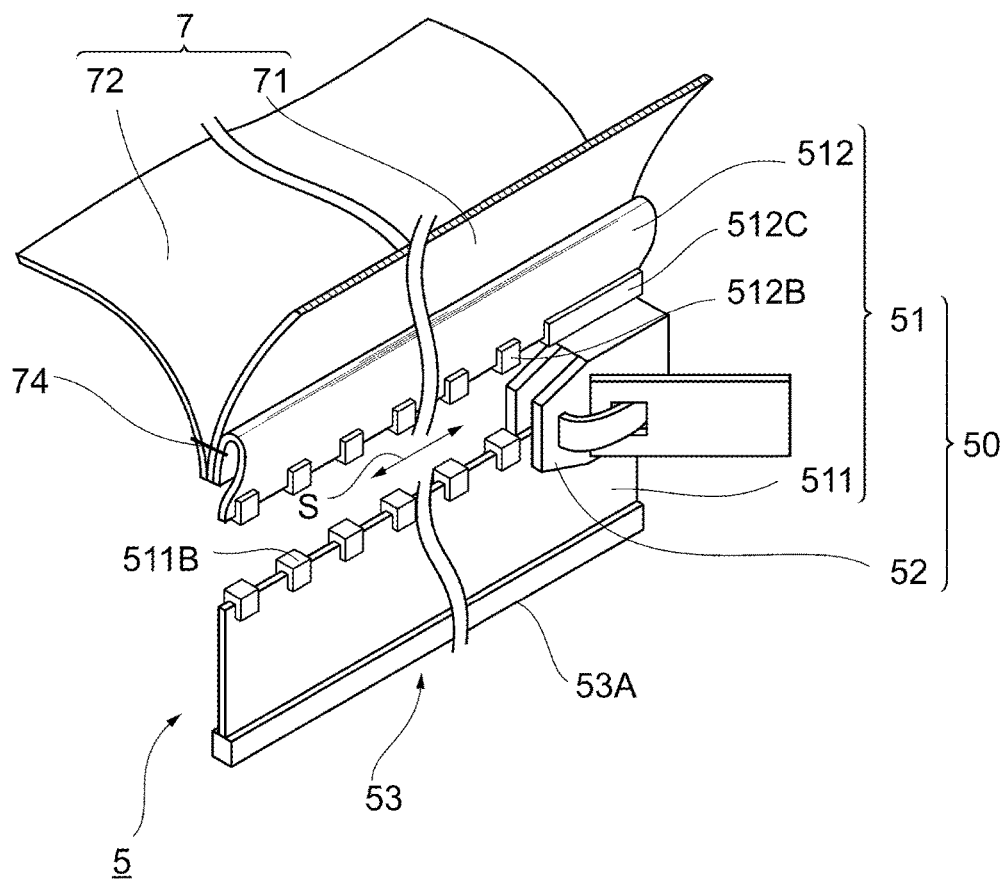
FIG. 3 is a perspective view showing a configuration of a fastening member, etc., with an example of a reinforcing part.
Figure 4:
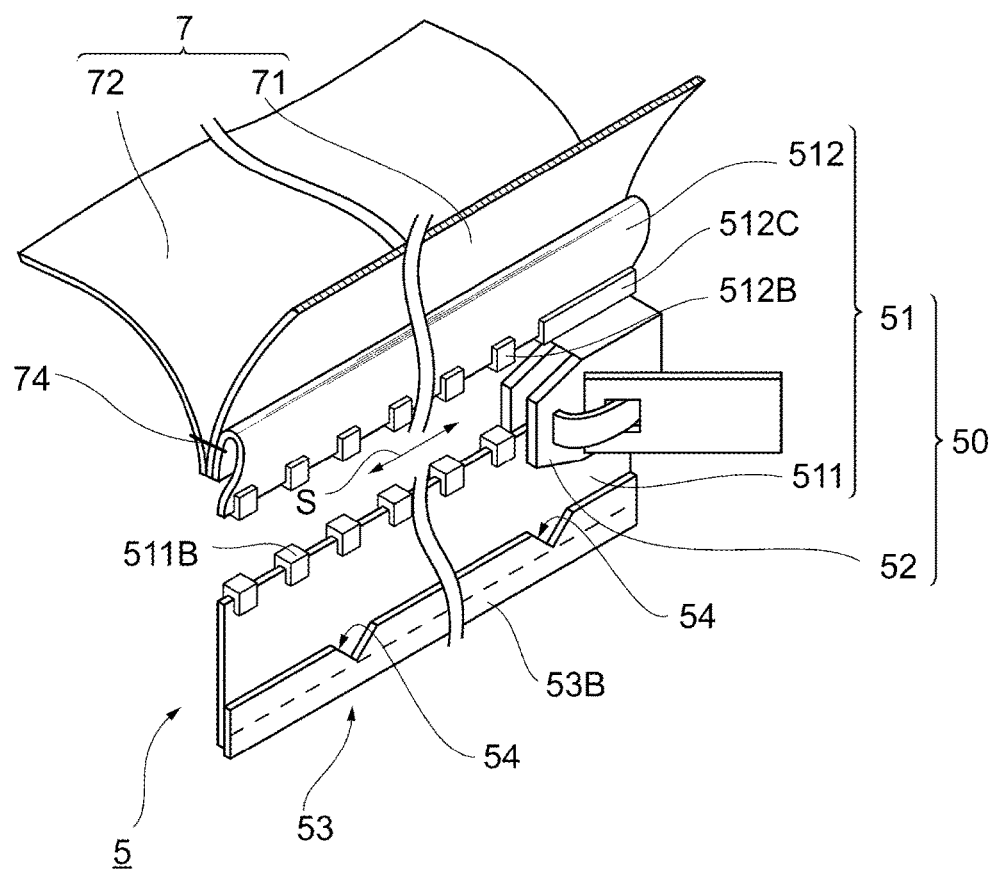
FIG. 4 is a perspective view showing a fastening member, etc. for showing another configuration example of a reinforcing part.

The hooking structure 10 that supports the changeable cover 7 by hooking is constituted by the fastening member 5, the hooking groove 11, an insert wire 16 and a C-ring 18 (see FIG. 3).

The hooking groove 11 is constituted by a recess 12 formed so as to have a predetermined width in the longitudinal direction of the back rest 2 along a boundary between the main cushioning part 41 and the side cushioning part 42, and the hooking groove 11 forms the exterior appearance of the seat 1 and accommodates a base-side tape portion (one fastener half) 511 of the fastening member 5 used for hooking the changeable cover 7. During the normal time, the recess 12 is compressed and closed between the main cushioning part 41 and the side cushioning part 42 due to the elasticity of the cushioning material 4. However, FIG. 2 shows the recess 12 in an open state for ease of understanding.

The backrest 3 is further provided with a hooking groove 11 extending along the transverse direction (the width direction of the backrest 3), in addition to the above-mentioned hooking groove 11, and the seat face 2 is also provided with a hooking groove 11 (see FIG. 1). However, the present embodiment will be described with regard to an example of the hooking groove 11 constituted by the recess 12 formed in the longitudinal direction as described above.

The fastening member 5 is a member that enables the changeable cover 7 to be attached and detached in the hooking groove 11 formed in the cushioning material 4. The fastening member 5 of the present embodiment is constituted by the slide fastener 50, including the fastener part 51 and the slider part 52 (see FIGS. 2 and 3). The changeable cover 7 can be fixed by hooking onto the seat 1 by inserting a cover-side tape portion 512 (the other fastener half) of the fastener part 51 of the fastening member 5 into the hooking groove 11 in the depth direction D of the recess 12 and fastening the fastening member 5 by engaging the cover-side tape portion 512 with the base-side tape portion 511.

The fastener part 51 of the slide fastener 50 is constituted by the base-side tape portion 511 and the cover-side tape portion 512. The base-side tape portion 511 and the cover-side tape portion 512 include elements (teeth) 511B and 512B to be engaged with each other, and an insertion pin (FIGS. 3-5 only show an insertion pin 512C of the cover-side tape portion 512) (see FIG. 3).

The slider part 52 of the slide fastener 50 is slid along the fastener part 51 in an arrangement direction of the elements 511B and 512B (hereinafter referred to as the "slide direction" and denoted with reference symbol "S"), and the slider part 52: engages with the elements 511B of the base-side tape portion 511 and the elements 512B of the cover-side tape portion 512 in order to bring the fastening member 5 into the "fastened state"; or disengages from such elements 511B and 512B in order to release the "fastened state" of the fastening member 5.

The cover-side tape portion 512 is sewn with the main face part 71 and the side face part 72 of the changeable cover 7 at the sewing part 74 so as to be secured to the changeable cover 7 (see FIGS. 2 and 3). It should be noted that, although an example of securing the cover-side tape portion 512 by sewing has been described in the present embodiment, the cover-side tape portion 512 may alternatively be secured by welding, etc.

A reinforcement part 53 is formed on an edge of the base-side tape portion 511 (if the base-side tape portion 511 has a large width and extends long in the depth direction D of the recess 12, the reinforcement part 53 is formed at the mid-point of the base-side tape portion 511). The reinforcement part 53 reinforces at least a portion of the base-side tape portion 511 which is anchored to the cushioning material 4 by the C-ring 18 in order to prevent the base-side tape portion 511 from being torn and to allow tension acting thereon during hooking to be maintained constantly with ease.

The specific configuration of the reinforcement part 53 is not particularly limited. One example of the reinforcement part 53 is a resin-made reinforcement member 53A that is integrally molded with the base-side tape portion 511 (see FIG. 3). By integrally molding the reinforcement member 53A using a resin, the cost for forming such reinforcement member 53A can be reduced.

As another example, the reinforcement part 53 may be constituted by a reinforcement member 53B that is formed by attaching a band-shaped resin-made plate to the base-side tape portion 511 by sewing, adhesion, etc. (see FIG. 4).

Figure 5:
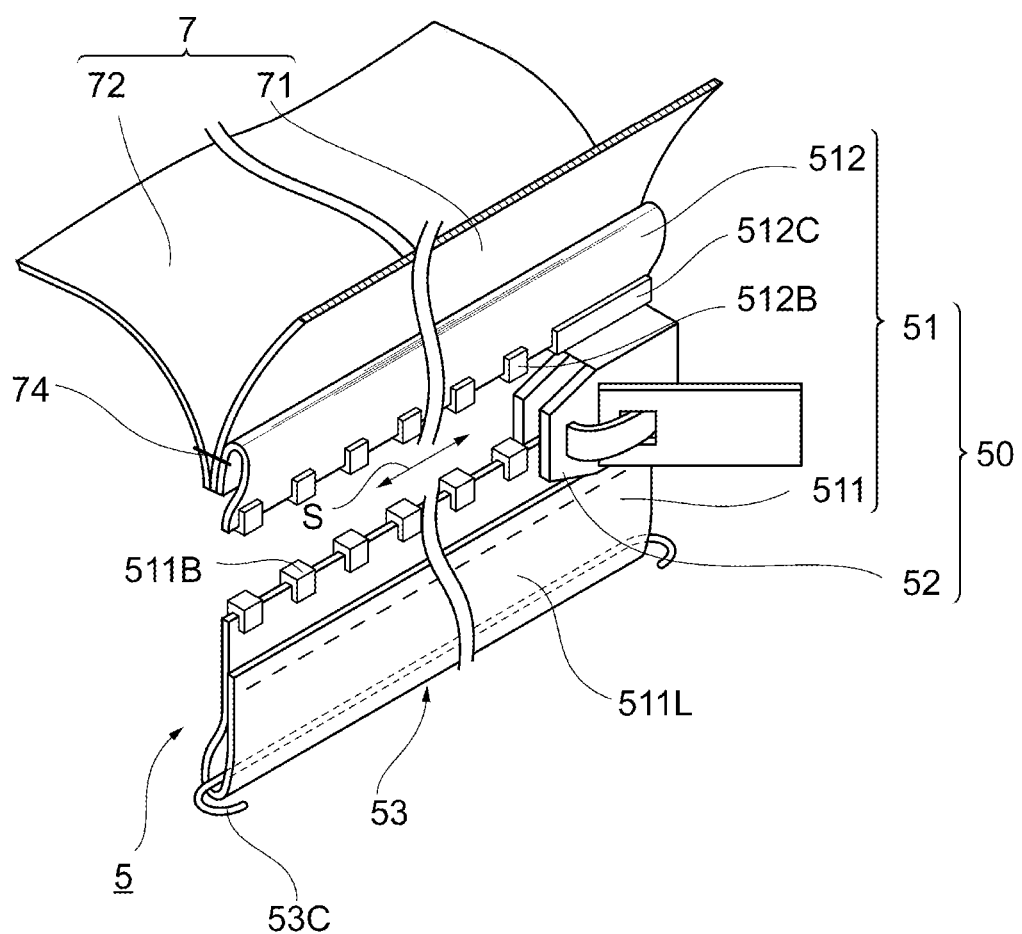
FIG. 5 is a perspective view showing a fastening member, etc. for showing a further configuration example of a reinforcing part.

As a further example, the reinforcement part 53 may be constituted by forming a loop 511L by sewing an end of the base-side tape portion 511 into a bag shape and inserting a linear reinforcement member 53C, such as a wire, into the loop 511L (see FIG. 5).

If anchoring position indicators 54 for indicating positions to anchor the C-rings 18 are provided in the above-mentioned reinforcement part 53, a predetermined number of C-rings 18 can be provided at predetermined positions at appropriate intervals using the anchoring position indicators 54 as markers. For example, in the fastening member 5 shown in FIG. 4, the anchoring position indicators 54 are formed by notching parts of the reinforcement member 53B (see FIG. 4). Although not shown, the above-mentioned reinforcement member 53A (see FIG. 3) may also be provided with the anchoring position indicators 54 in the same way. Alternatively, the anchoring position indicators 54 may be formed in the base-side tape portion 511 by, for example, providing marks in the above-mentioned loop 511L (see FIG. 5).

The insert wire 16 is embedded inside the cushioning material 4 of the backrest 2 at a predetermined depth from the bottom of the recess 12 (see FIG. 2; the groove depth direction of the recess 12 is denoted by reference symbol D in FIG. 2). The predetermined depth as used herein refers to a depth suitable for anchoring the base-side tape portion 511 of the fastening member 5 and the insert wire 16 by the C-ring 18 by taking into consideration the size, etc. of the C-ring 18 (see FIG. 2).

Although the specific shape of the insert wire 16 is not shown in the drawing, the insert wire 16 may be a wire that is extended straight in a direction in which the recess 12 is formed (in the present embodiment, the longitudinal direction along the boundary between the main cushioning part 41 and the side cushioning part 42) or may be a wire wherein a portion thereof to which the C-ring 18 is anchored is cranked toward the recess 12.

The C-ring 18 anchors the base-side tape portion 511 of the fastening member 5 to the seat member in the hooking groove 11. Although not shown, the C-ring 18 can be easily anchored to a predetermined position in the hooking groove 11 using a tool dedicated to fasten the C-ring. The C-ring 18 is formed in a substantially C shape, with an end thereof extending through the base trim cover 6 and the base-side tape portion 511 wrapped by the base trim cover 6 and hooking the base-side tape portion 511, the other end thereof sticking into the cushioning material 4 and hooking the insert wire 16, the ends being compressed and deformed so as to fasten the base-side tape portion 511 and the insert wire 16 (see FIG. 2).

The hooking groove 11 in the backrest 3 and the hooking groove 11 in the seat face 2, as well as the hooking structure 10 constituted by such hooking grooves 11, have a configuration similar to the hooking groove 11 and the hooking structure 10 shown in FIG. 2 and the description thereof will therefore be omitted.

In the hooking structure 10 of the seat 1 in the present embodiment described above, since the fastening member 5 is not sewn to the base trim cover 6 (in other words, the C-ring 18 for anchoring (the base-side tape portion 511 of) the fastening member 5 to the cushioning material 4 merely extends through the base trim cover 6), the base trim cover 6 and the fastening member 5 are independent of and separable from each other. Accordingly, if the fastening member 5 is broken, it is possible for only the fastening member 5 to be detached and replaced by detaching the C-ring 18 to thereby release the anchored state, while leaving the base trim cover 6 as-is. In other words, since it is possible for only the fastening member 5 to be replaced without the need to replace the base trim cover 6, it is possible to reduce the repair costs required when the fastening member 5 is broken.

It should be noted that the above-described embodiment is merely an example of a preferred embodiment of the present invention, and the present invention is not limited thereto and various modifications can be made thereto without departing from the gist of the present invention. For example, the seat 1 according to the present invention 1 may be utilized as aircraft seats, passenger ship seats, etc., in addition to automobile seats.

Although the provision of the insert member, such as the insert wire 16, in the cushioning material 4, as in the embodiment described above, is preferable in that it is capable of relaxing a localized deformation of the cushioning material 4 due to the hooking structure 10 and making it difficult to move or pull out the C-ring 18, it is not necessary for the insert member to be provided as long as the C-ring can be rigidly anchored by the cushioning material 4 alone.

The above-mentioned C-ring 18 is merely a preferred example of an anchoring member for fastening (the base-side tape portion 511 of) the fastening member 5 and the insert wire 16, and rings of other shapes or a variety of other anchoring members may be used.

Figure 6:
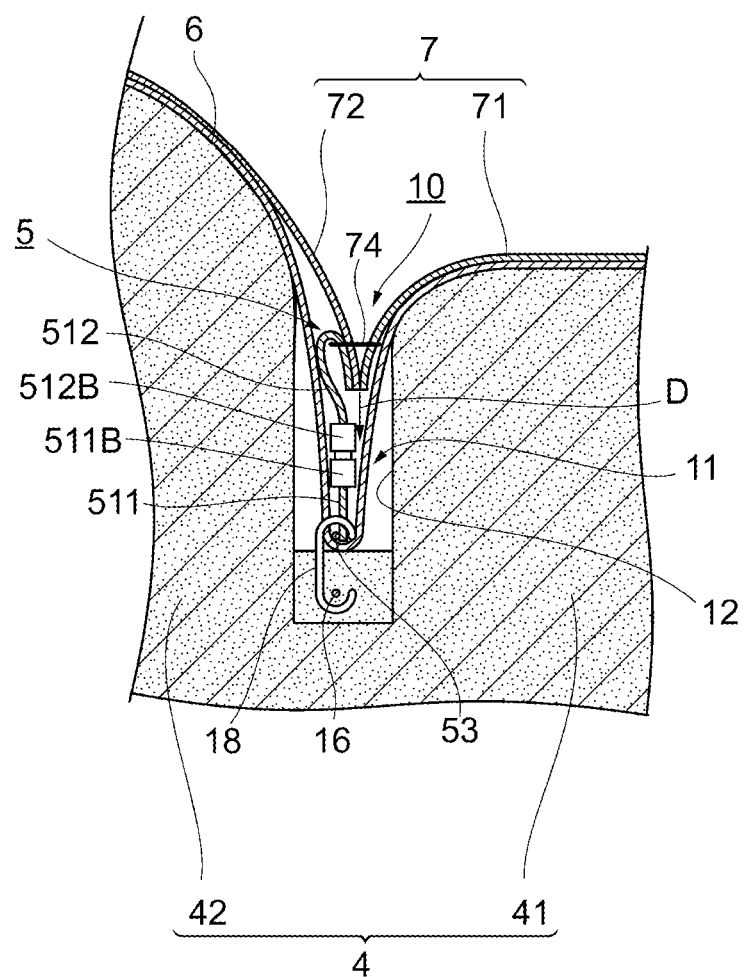
FIG. 6 is a cross-sectional view showing a hooking structure in a backrest (seat member) in a situation where a base trim cover is fixed to a cushioning material by a C-ring which anchors the fastening member at the same time.

Although the configuration in which the surface of the cushioning material 4 is covered with the base trim cover 6 by, for example, adhesion or integral foam molding has been described in the present embodiment (see FIG. 2), such configuration is merely an example of a preferred configuration, and other configurations may also be employed. For example, the base trim cover 6 may be fixed to the cushioning member 4 by the C-ring 18 which anchors the fastening member 5 at the same time (see FIG. 6).

Figure 7:
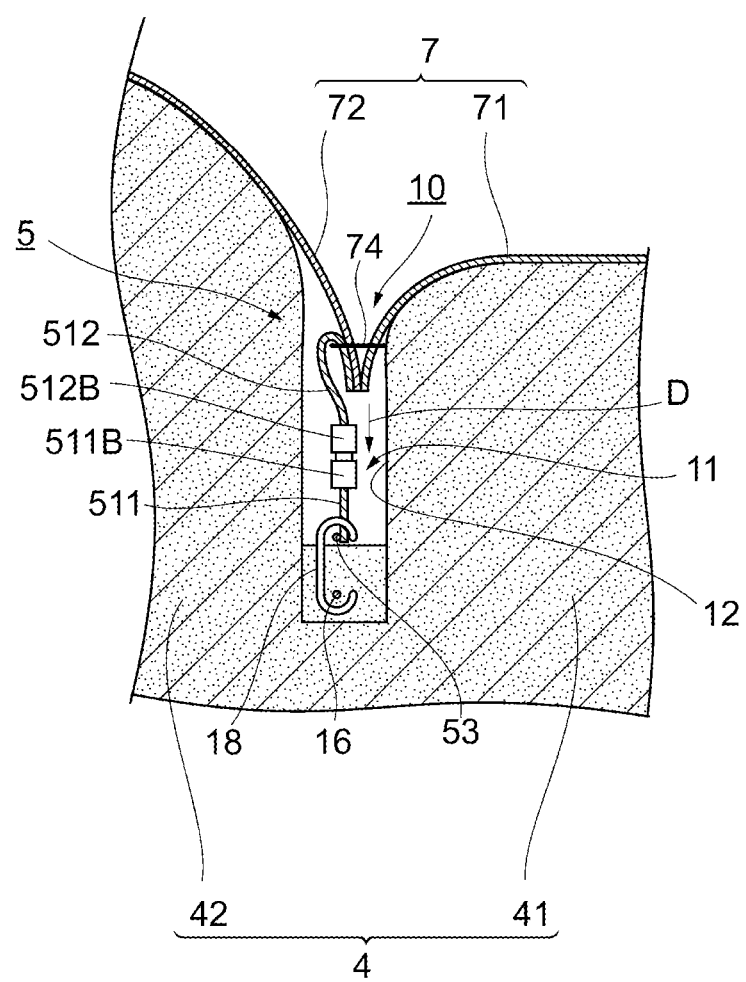
FIG. 7 is a cross-sectional view showing another embodiment of the present invention.

Furthermore, the present invention is also applicable to a hooking structure 10 of a seat 1 having no base trim cover 6 (see FIG. 7). Since such seat 1 does not have a base trim cover, even if the slide fastener 50 is broken, an operation of replacing the slide fastener 50 together with the base trim cover is not necessary, and it is possible to detach and replace only the fastening member 5 by detaching the C-ring 18 and releasing the anchored state, as in the case of the embodiment described above.

INDUSTRIAL APPLICABILITY

The present invention is suitably applicable to a hooking structure of a seat which allows a changeable cover to be attached to and detached from a seat member having a base trim cover.

REFERENCE SIGNS LIST

1: seat
2: seat face (seat member)
3: backrest (seat member)
4: cushioning material
5: fastening member
6: base trim cover
7: changeable cover
10: hooking structure
11: hooking groove (groove for hooking)
16: insert wire (insert member)
18: C-ring (anchoring member)
50: slide fastener
51: fastener part
52: slider part
53: reinforcement part
53A, 53B, 53C: reinforcement member
54: anchoring position indicator
74: sewing part (securing part)
511: base-side tape portion (one fastener half)
512: cover-side tape portion (the other fastener half)

What is claimed is:

1. A seat hooking structure which supports by hooking a changeable cover so as to be detachably attached to a seat member provided with a base trim cover, the seat hooking structure comprising:
   a fastening member constituted by an open-type slide fastener that includes: a fastener part constituted by one fastener half and another fastener half; and a slider part that slides along the fastener part so as to open and close the one fastener half and the other fastener half, the fastening member not being sewn to the base trim cover; and
   an anchoring member which anchors the one fastener half to the seat member in a groove for hooking formed in the seat member,
   wherein the other fastener half and the changeable cover are secured to each other by a securing part.

2. The seat hooking structure according to claim 1, wherein an insert member with which the anchoring member is to be engaged is provided inside the seat member.

3. The seat hooking structure according to claim 1, wherein at least a portion of the one fastener half which is anchored to the seat member by the anchoring member is reinforced by a reinforcement part.

4. The seat hooking structure according to claim 3, wherein the reinforcement part is constituted by a resin-made reinforcement member which is integrally molded with the one fastener half.

5. The seat hooking structure according to claim 3, wherein the reinforcement part is constituted by a reinforcement member attached to the one fastener half.

6. The seat hooking structure according to claim 3, wherein the reinforcement part is constituted by a reinforcement member inserted into the one fastener half which has been sewn into a bag-like shape.

7. The seat hooking structure according to claim 4, wherein the reinforcement member or the one fastener half is provided with an anchoring position indicator which indicates an anchoring position of the anchoring member.

8. The seat hooking structure according to claim 5, wherein the reinforcement member or the one fastener half is provided with an anchoring position indicator which indicates an anchoring position of the anchoring member.

9. The seat hooking structure according to claim 6, wherein the reinforcement member or the one fastener half is provided with an anchoring position indicator which indicates an anchoring position of the anchoring member.

* * * * *